United States Patent
Matsuda et al.

(10) Patent No.: US 9,665,863 B2
(45) Date of Patent: *May 30, 2017

(54) CONDUCTING COMMERCE BETWEEN INDIVIDUALS

(75) Inventors: Paul Matsuda, Mill Valley, CA (US);
Sara E. Perry, Mill Valley, CA (US);
Tracy L. Wilk, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 13/450,298

(22) Filed: Apr. 18, 2012

(65) Prior Publication Data

US 2012/0203654 A1 Aug. 9, 2012

Related U.S. Application Data (63) Continuation of application No. 12/892,807, filed on Sep. 28, 2010, which is a continuation of application
(Continued)

(51) Int. Cl.
*G06Q 30/00* (2012.01)
*G06Q 20/20* (2012.01)
(Continued)

(52) U.S. Cl.
CPC .......... *G06Q 20/204* (2013.01); *G06Q 20/04* (2013.01); *G06Q 20/10* (2013.01); *G06Q 20/12* (2013.01);
(Continued)

(58) Field of Classification Search
None
See application file for complete search history.

(56) References Cited

U.S. PATENT DOCUMENTS

| 4,341,951 A | 7/1982 | Benton |
| 4,755,872 A | 7/1988 | Bestler et al. |

(Continued)

FOREIGN PATENT DOCUMENTS

| AU | 15844/99 A | 5/1999 |
| AU | 11556/00 A | 6/2000 |

(Continued)

OTHER PUBLICATIONS

U.S. Appl. No. 60/119,189.*
(Continued)

*Primary Examiner* — Ariel Yu
(74) *Attorney, Agent, or Firm* — Kilpatrick Townsend & Stockton LLP (57) ABSTRACT

Receiving payment includes the establishment, at a first server, a transaction record including information identifying a payment amount, a first account to be credited by the payment amount, and a second account to be debited by a debit amount. A financial authorization network performs an authorization analysis on at least the second account. The second account is debited if the authorization analysis is successfully completed, and the first account is directly credited by the payment amount to conclude the transaction. Risk analysis may be performed for each individual. Payment is integrated with shipping.

21 Claims, 6 Drawing Sheets

| Trans ID | Buyer Acct ID | Seller Acct ID | Price | Description | Shipping | Trans. Date | Escrow Close |
|---|---|---|---|---|---|---|---|
| 1234567 | 888555 | 888556 | 100.00 | Ping Golf clubs (PW-3 Iron) | Fed Ex Tracking No. 1111111 | 011599 | 012099 |
| 1234568 | 888557 | 888555 | 29.00 | Beanie baby (.gif picture attached) | UPS tracking no. xyz123 | 011699 | 011699 |
| 1234569 | (TBD) | 888557 | 29.00 | Original manuscript | (TBD) | (TBD) | (TBD) |
| .... | .... | .... | .... | .... | .... | .... | .... |

414 / 416 / 418 / 420 / 422 / 424 / 426 428

Related U.S. Application Data

No. 12/190,130, filed on Aug. 12, 2008, now Pat. No. 7,921,038, which is a continuation of application No. 09/352,468, filed on Jul. 14, 1999, now Pat. No. 7,451,114.

(60) Provisional application No. 60/135,103, filed on Feb. 19, 1999.

(51) Int. Cl.

| | | |
|---|---|---|
| *G06Q 20/04* | (2012.01) | |
| *G06Q 20/10* | (2012.01) | |
| *G06Q 20/12* | (2012.01) | |
| *G06Q 20/40* | (2012.01) | |
| *G06Q 30/02* | (2012.01) | |
| *G06Q 30/06* | (2012.01) | |
| *G06Q 30/08* | (2012.01) | |
| *G06Q 40/00* | (2012.01) | |
| *G06Q 40/02* | (2012.01) | |

(52) U.S. Cl.
CPC .......... *G06Q 20/40* (2013.01); *G06Q 20/403* (2013.01); *G06Q 30/0241* (2013.01); *G06Q 30/06* (2013.01); *G06Q 30/0601* (2013.01); *G06Q 30/08* (2013.01); *G06Q 40/00* (2013.01); *G06Q 40/02* (2013.01); *G06Q 40/025* (2013.01); *G06Q 40/12* (2013.12)

(56) References Cited

U.S. PATENT DOCUMENTS

| | | | |
|---|---|---|---|
| 4,799,156 | A | 1/1989 | Shavit |
| 5,008,930 | A | 4/1991 | Gawrys et al. |
| 5,023,904 | A | 6/1991 | Kaplan et al. |
| 5,053,607 | A | 10/1991 | Carlson et al. |
| 5,175,416 | A | 12/1992 | Mansvelt et al. |
| 5,220,501 | A | 6/1993 | Lawlor et al. |
| 5,383,113 | A | 1/1995 | Kight et al. |
| 5,434,394 | A | 7/1995 | Roach et al. |
| 5,440,634 | A | 8/1995 | Jones et al. |
| 5,465,206 | A | 11/1995 | Hilt et al. |
| 5,485,510 | A | 1/1996 | Colbert |
| 5,539,450 | A | 7/1996 | Handelman |
| 5,591,949 | A | 1/1997 | Bernstein |
| 5,650,604 | A | 7/1997 | Marcous et al. |
| 5,652,786 | A | 7/1997 | Rogers |
| 5,659,165 | A | 8/1997 | Jennings et al. |
| 5,664,115 | A | 9/1997 | Fraser |
| 5,679,940 | A | 10/1997 | Templeton et al. |
| 5,699,528 | A | 12/1997 | Hogan |
| 5,710,887 | A | 1/1998 | Chelliah |
| 5,717,989 | A | 2/1998 | Tozzoli et al. |
| 5,729,460 | A | 3/1998 | Plett et al. |
| 5,732,400 | A | 3/1998 | Mandler et al. |
| 5,745,886 | A | 4/1998 | Rosen |
| 5,757,917 | A | 5/1998 | Rose et al. |
| 5,778,313 | A | 7/1998 | Fougnies |
| 5,787,159 | A | 7/1998 | Hamilton et al. |
| 5,790,677 | A | 8/1998 | Fox |
| 5,794,207 | A | 8/1998 | Walker et al. |
| 5,794,210 | A | 8/1998 | Goldhaber et al. |
| 5,796,832 | A | 8/1998 | Kawan |
| 5,815,657 | A | 9/1998 | Williams |
| 5,826,241 | A | 10/1998 | Stein et al. |
| 5,860,068 | A | 1/1999 | Cook |
| 5,897,621 | A | 4/1999 | Boesch |
| 5,910,896 | A | 6/1999 | Hahn-Carlson |
| 5,937,396 | A | 8/1999 | Konya |
| 5,945,652 | A | 8/1999 | Ohki et al. |
| 5,949,044 | A | 9/1999 | Walker et al. |
| 5,991,748 | A | 11/1999 | Taskett |
| 5,991,749 | A | 11/1999 | Morrill, Jr. |
| 6,029,150 | A | 2/2000 | Kravitz |
| 6,039,250 | A | 3/2000 | Ito et al. |
| 6,047,264 | A * | 4/2000 | Fisher ............ G06Q 10/063114 705/26.44 |
| 6,058,373 | A | 5/2000 | Blinn et al. |
| 6,067,532 | A | 5/2000 | Gebb |
| RE36,788 | E | 7/2000 | Mansvelt et al. |
| 6,092,053 | A | 7/2000 | Boesch et al. |
| 6,138,107 | A | 10/2000 | Elgamal |
| 6,169,974 | B1 | 1/2001 | Baumgartner et al. |
| 6,205,433 | B1 | 3/2001 | Boesch et al. |
| 6,240,396 | B1 * | 5/2001 | Walker et al. .................... 705/5 |
| 6,246,996 | B1 | 6/2001 | Stein |
| 6,263,317 | B1 | 7/2001 | Sharp et al. |
| 6,267,292 | B1 | 7/2001 | Walker et al. |
| 6,295,522 | B1 | 9/2001 | Boesch |
| 6,317,745 | B1 | 11/2001 | Thomas et al. |
| 6,341,353 | B1 * | 1/2002 | Herman ................ A63F 13/12 705/39 |
| 6,363,363 | B1 | 3/2002 | Haller et al. |
| 6,394,343 | B1 | 5/2002 | Berg et al. |
| 6,418,420 | B1 | 7/2002 | DiGiorgio et al. |
| 6,430,305 | B1 | 8/2002 | Decker |
| 6,439,456 | B1 | 8/2002 | Bansal et al. |
| 6,488,203 | B1 | 12/2002 | Stoutenburg et al. |
| 6,502,747 | B1 | 1/2003 | Stoutenburg et al. |
| 6,571,149 | B1 | 5/2003 | Hahn-Carlson |
| 6,609,113 | B1 | 8/2003 | O'Leary et al. |
| 6,612,487 | B2 | 9/2003 | Tidball et al. |
| 6,704,717 | B1 | 3/2004 | Tate |
| 6,761,309 | B2 | 7/2004 | Stoutenburg et al. |
| 6,769,605 | B1 | 8/2004 | Magness |
| 6,814,282 | B2 | 11/2004 | Seifert et al. |
| 6,868,391 | B1 | 3/2005 | Hultgren |
| 6,931,380 | B2 | 8/2005 | Shedd et al. |
| 6,994,251 | B2 | 2/2006 | Hansen et al. |
| 7,003,493 | B2 | 2/2006 | Weichert et al. |
| 7,031,939 | B1 | 4/2006 | Gallagher et al. |
| 7,070,094 | B2 | 7/2006 | Stoutenburg et al. |
| 7,089,208 | B1 | 8/2006 | Levchin |
| 7,120,608 | B1 | 10/2006 | Gallagher et al. |
| 7,194,437 | B1 | 3/2007 | Britto et al. |
| 7,225,156 | B2 | 5/2007 | Fisher et al. |
| RE39,736 | E | 7/2007 | Morrill, Jr. |
| 7,249,093 | B1 | 7/2007 | King |
| 7,373,329 | B2 | 5/2008 | Gallagher et al. |
| 7,395,241 | B1 | 7/2008 | Cook et al. |
| 7,415,442 | B1 | 8/2008 | Battaglini et al. |
| 7,447,663 | B1 | 11/2008 | Barker et al. |
| 7,451,114 | B1 | 11/2008 | Matsuda et al. |
| 7,454,232 | B2 | 11/2008 | Abuhamdeh |
| 7,499,886 | B2 | 3/2009 | Matsuda et al. |
| 7,533,064 | B1 | 5/2009 | Boesch |
| 2002/0128967 | A1 | 9/2002 | Meyer et al. |
| 2002/0152168 | A1 | 10/2002 | Neofytides et al. |
| 2002/0174016 | A1 | 11/2002 | Cuervo |
| 2003/0061162 | A1 | 3/2003 | Matthews |
| 2003/0105710 | A1 | 6/2003 | Barbara et al. |
| 2003/0130940 | A1 | 7/2003 | Hansen et al. |
| 2004/0039693 | A1 | 2/2004 | Nauman et al. |
| 2004/0049455 | A1 | 3/2004 | Mohsenzadeh |
| 2004/0188515 | A1 | 9/2004 | Jimenez |
| 2005/0080697 | A1 | 4/2005 | Foss, Jr. et al. |
| 2005/0209958 | A1 | 9/2005 | Michelsen et al. |
| 2007/0045401 | A1 | 3/2007 | Sturm |
| 2007/0057043 | A1 | 3/2007 | De la Garza Ortega et al. |
| 2007/0094132 | A1 | 4/2007 | Waterson et al. |
| 2008/0033877 | A1 | 2/2008 | Blair et al. |
| 2008/0120231 | A1 | 5/2008 | Megwa |
| 2009/0307143 | A1 | 12/2009 | Reistad |
| 2010/0332284 | A1 * | 12/2010 | Hilbush et al. .................... 705/9 |

FOREIGN PATENT DOCUMENTS

| | | |
|---|---|---|
| CA | 2592534 A1 | 3/1996 |
| EP | 0 785 517 A2 | 7/1997 |
| EP | 0 917 120 A2 | 5/1999 |
| EP | 1 006 469 A1 | 6/2000 |
| WO | WO 96/13814 A1 | 5/1996 |
| WO | WO 98/40809 A2 | 9/1998 |

(56) References Cited

FOREIGN PATENT DOCUMENTS

| WO | WO 99/08218 A1 | 2/1999 |
|---|---|---|
| WO | WO 99/24892 A2 | 5/1999 |
| WO | WO 00/33219 A1 | 6/2000 |

OTHER PUBLICATIONS

"Azerigazbank Open Joint Stock Company"; http://www.azerigazbank.com/eng/cardtocard.php; accessed Jun. 21, 2010.
Beckett, Jaime, "Rise of the Online Middlemen/Escrow Services in Demand as Net Auction Sites Proliferate," printed Feb. 17, 2004, http://global.factiva.com/en/ arch/print_results.asp.
"Card to Card Money Transfer"; http://www.idbibank.com/products/cardtocard.asp>; accessed Jun. 21, 2010.
"Card Uses Prestige Gold Card"; http://prestigecard.cc/cardUses.html; accessed Jun. 21, 2010.
Cardservice International and iCat Alliance Breaks Down Barriers for Merchants Moving to Web-based Commerce PR Newswire. New York:Apr. 13, 1998. p. 1.
D'Silva, Vijay, et al.; "What's in the cards? The future of the US payment card system."; The *McKinsey Quarterly*, Autumn 1998 i4 p. 90(8).
Federal Reserve Financial Services; "FedACH Services/Direct Deposit and Direct Payment"; FRB Financial Services.
Federal Reserve Financial Services; FedACH Services/FedACH Participation Agreement; FRB Financial Services.
Federal Reserve Financial Services; "FedACH"; FRB Financial Services.
Federal Reserve System; "A Consumer's Guide to Direct Deposit"; Federal Reserve Financial System.
Federal Reserve System; "Benefits of ACH Origination"; Federal Reserve Financial System.
Federal Reserve System; "Fed ACH Your Choice for the Future"; Federal Reserve Financial System.
Federal Reserve System; "FedACH Your Choice for the Future"; Federal Reserve Financial System.
Federal Reserve System; "Getting Started with FedACH Origination, A Manual for Financial Institutions"; Federal Reserve System.
FT Financial Times; Inside Track "DigiCash is dead. Long live DigiCash!," printed Nov. 16, 1998; http://global.factiva.com/en/arch/print_results.asp.
"Maybank and Visa Launch Card-to-Card Payments in Singapore with Visa Money Transfer"; <http://www.pata.org/patasite/fileadmin/whatsnew/2007/NR_Visa_Maybank_VMT_Launch_FINAL.PDF>; accessed Jun. 21, 2010.
Mu, Yi and Varadharajan, Vijay, "A New Scheme of Credit Based Payment for Electronic Commerce"; School of Computing and IT, University of Western Sydney, Nepean, PO Box 10, Kingswood, N.S.W. 2747, Australia.
Nacha , "What is ACH?" Copyright © 2002. Federal Reserve Financial Services; "FedACH Services"; FRB Financial Services.
Neuman, B. Clifford and Medvinsky, Gennady; "Requirements for Network Payment: The NetCheque Perspective"; 1063-6390/95 1995 IEEE.
O'Mahony et al., "Electronic Payment Systems", chapter 5 (1997).
Panurach, Patiwat, "Money in Electronic Commerce," Communications of the ACM, vol. 39, No. 6, pp. 45-50, 1996.
"Services"; http://www.arca.am/services.php-en; accessed Jun. 21, 2010.
"SmartMetric"; http://www.smartmetric.com/money/money.html; accessed Jun. 21, 2010.

Sirbu, Marvin A., "Credits and Debits on the Internet," IEEE Spectrum, pp. 23-29, 1997.
Canadian Office Action dated Dec. 8, 2009 in App. No. 2,371,820.
Notice of Allowance dated Jul. 28, 2008 in U.S. Appl. No. 09/352,468.
Office Action dated Jan. 29, 2008 in U.S. Appl. No. 09/352,468.
Office Action dated Aug. 8, 2007 in U.S. Appl. No. 09/352,468.
Office Action dated Jan. 26, 2007 in U.S. Appl. No. 09/352,468.
Office Action dated Aug. 7, 2006 in U.S. Appl. No. 09/352,468.
Office Action dated Feb. 6, 2006 in U.S. Appl. No. 09/352,468.
Office Action dated Aug. 27, 2003 in U.S. Appl. No. 09/352,468.
Office Action dated Jan. 21, 2003 in U.S. Appl. No. 09/352,468.
Notice of Allowance dated Oct. 27, 2008 in U.S. Appl. No. 10/429,440.
Office Action dated Apr. 21, 2008 in U.S. Appl. No. 10/429,440.
Office Action dated Aug. 23, 2007 in U.S. Appl. No. 10/429,440.
Office Action dated Jan. 26, 2007 in U.S. Appl. No. 10/429,440.
Office Action dated Jul. 7, 2006 in U.S. Appl. No. 10/429,440.
Office Action dated Jan. 23, 2006 in U.S. Appl. No. 10/429,440.
Office Action dated Jun. 23, 2005 in dated U.S. Appl. No. 10/429,440.
Office Action dated Jan. 25, 2005 in U.S. Appl. No. 10/429,440.
Office Action dated Aug. 18, 2004 in U.S. Appl. No. 10/429,440.
U.S. Appl. No. 60/144,633, filed Jul. 19, 1999; Max Levchin et al. (14 pgs).
U.S. Appl. No. 60/131,785, filed Apr. 30, 1999; Max Levchin et al. (13 pgs).
U.S. Appl. No. 12/892,807, filed Sep. 28, 2001; Paul J. Matsuda et al. (51 pgs).
Australian Official Report dated Mar. 10, 2003 in AU Application No. 33709/00.
European Examination Report dated Feb. 19, 2009 in EP Application No. 00 911 887.8.
Office Action mailed May 21, 2013 in U.S. Appl. No. 13/450,153, 11 pages.
Office Action mailed Jun. 7, 2013 in U.S. Appl. No. 13/449,715, 11 pages.
Office Action mailed Dec. 7, 2012 in U.S. Appl. No. 13/449,715, 10 pages.
Office Action mailed Dec. 12, 2012 in U.S. Appl. No. 13/450,153, 11 pages.
Office Action mailed Dec. 14, 2012 in U.S. Appl. No. 13/450,298, 9 pages.
Ebay User Agreement, Jan. 17, 1999, http:://web.archive.org/web/19990117064358/http://pages.ebay.com/aw/user-agreement.html, 4 pages.
Weinstein, "Emerging Telecommunications Needs of the Card Industry," IEEE Communications Magazine, vol. 22, No. 7, Jul. 1984, 6 pages.
Clurman et al. "Electronic Commerce with Software Agents," MIT Sloan School of Management, May 14, 1997, http://alumni.media.mit.edu/~guttman/research/commerce/papers/commerce2.pdf, 47 pages.
Office Action mailed Feb. 17, 2016 in Canadian Application No. 2,371,820, 9 pages.
Office Action mailed Nov. 7, 2014 in U.S. Appl. No. 13/450,235, 16 pages.
Office Action mailed Jul. 18, 2014 in U.S. Appl. No. 13/450,235, 13 pages.
Office Action mailed Aug. 8, 2014 in U.S. Appl. No. 13/449,715, 5 pages.
Notice of Allowance mailed Feb. 2, 2017 in U.S. Appl. No. 13/450,153, 16 pages.

* cited by examiner

| Account ID | Card No. | Exp. | Cardholder Info | e-mail | Reg. Date |
|---|---|---|---|---|---|
| 888555 | 4000 0000 0000 0000 | 0100 | John Doe, 111 State Street, Boston, MA | Doe@aol.com | 010199 |
| 888556 | 4000 0111 1111 1111 | 1099 | Fred Flintstone, Cave Creek, AZ | Fred@cave.com | 070198 |
| 888557 | 4000 2222 2222 2222 | 0103 | Ignatius Reilly, New Orleans, LA | Ig@aol.com | 110199 |
| 888558 | (TBD) | (TBD) | (TBD) | (TBD) | (TBD) |
| ... | | | | | |

FIG. 6A

| Trans ID | Buyer Acct ID | Seller Acct ID | Price | Description | Shipping | Trans. Date | Escrow Close |
|---|---|---|---|---|---|---|---|
| 1234567 | 888555 | 888556 | 100.00 | Ping Golf clubs (PW-3 Iron) | Fed Ex Tracking No. 1111111 | 011599 | 012099 |
| 1234568 | 888557 | 888555 | 29.00 | Beanie baby (.gif picture attached) | UPS tracking no. xyz123 | 011699 | 011699 |
| 1234569 | (TBD) | 888557 | 29.00 | Original manuscript | (TBD) | (TBD) | (TBD) |
| ... | | | | | | | |

FIG 6B

CONDUCTING COMMERCE BETWEEN INDIVIDUALS

This application is a continuation of U.S. patent application Ser. No. 12/892,807, filed Sep. 28, 2010, which is a continuation of U.S. patent application Ser. No. 12/190,130, filed Aug. 12, 2008, now U.S. Pat. No. 7,921,038, which is a continuation of U.S. patent application Ser. No. 09/352,468, filed on Jul. 14, 1999, now U.S. Pat. No. 7,451,114, which is a non-provisional of and claiming benefit under 35 U.S.C. 119 (e) of U.S. Provisional Patent Application No. 60/135,103, filed Feb. 19, 1999, entitled "Method and Apparatus for Person to Person Commerce," of which are all herein incorporated by reference.

BACKGROUND OF THE INVENTION

The present invention relates to electronic commerce and more particularly to systems and methods for conducting electronic commerce between individuals.

Consumers today have a large number of payment choices when purchasing goods or services in person at merchant storefront locations or in mail-order or telephone commerce (referred to herein as "physical world" transactions). For example, most merchants in these transactions accept cash, checks, travelers checks, money orders, and a variety of payment cards, including debit cards, credit cards, and even smart cards. Most consumers have one or more payment cards in their wallet as well as cash and checks. With access to these forms of payment, a consumer can purchase almost any good or service from any merchant.

Consumers also have a large number of choices of how to purchase goods from other individuals in the physical world. For example, at a garage sale, a consumer can choose to hand a seller cash, a personal check, a travelers check, or a money order for goods being sold at the garage sale. The seller can choose to accept or not to accept the purchaser's check based on information available to the seller at the time of purchase. Individuals who are not merchants are not able to accept payment cards for purchases because of payment rules established by banks and card associations which, essentially, limit payment card acceptance to qualified merchants.

Many existing forms of payments in the physical world depend upon the seller's ability to trust, or to identify the buyer. For example, a merchant may require a form of identification before accepting a consumer's check for payment. A catalog merchant may wait until a consumer's check has cleared or a payment card transaction has been authorized before shipping the goods to the consumer. A person selling goods to another individual (e.g., at a garage sale, etc.), may require an even greater number of forms of identification from a prospective buyer who chooses to use a check or may simply insist on cash as the only accepted form of payment. Consumers have learned to accept and live with these limitations in the physical world, partly because of the benefits they provide (e.g., greater convenience in form and mode of payment, etc.). The reduced fraud losses made possible by the use of existing payment systems directly benefits banks and merchants and indirectly benefits consumers in the form of reduced transaction costs.

Another aspect of buying and selling goods in the physical world is the consumer's ability to inspect the goods before paying for them. For example, a consumer interested in buying a used television at a garage sale may inspect it before purchasing it. If, upon inspection, it turns out that the television is does not work properly, the purchaser can choose not to buy it or to offer the seller a lower price.

Recently, advances in technology have opened up new marketplaces. In particular, the Internet has developed into a new means by which consumers can access and purchase information, communicate and pay for services, and acquire and pay for goods. Because of the anonymous nature of communication networks, new methods and systems must be developed to substitute for existing procedures used in physical world transactions.

A number of new technologies have been developed to allow payments over the Internet. For example, the Secure Electronic Transaction (SET) specification has been developed to allow customers to make payment card transactions securely over the Internet. The SET protocol, however, is intended for use between consumers and merchants. Other protocols and tools have also been developed to enable transactions to be conducted over the Internet, but these methods are again limited to transactions conducted between consumers and merchants.

None of these existing systems are designed to permit transactions to be conducted between individuals. So-called "stored value" smart card systems have been developed which may be used to conduct commerce between individuals, such as the Net1 system described in U.S. Pat. No. 5,175,416. In general, these smart card systems utilize electronic purses which contain tokens representing value which may be passed from one consumer to another. However, these chip card-based stored value smart card systems are not yet in widespread use in the U.S. or in other countries around the world. Therefore, it would be desirable to provide a method and system which allows individuals to conduct transactions with other individuals using existing payment cards.

This need increases as new trading places develop on the Internet. A recent phenomenon is the development of auction sites and classified ad sites where individuals can sell goods to other individuals over the Internet. Unfortunately, there is no widely-available payment scheme that is well-suited for these types of transactions. Most auction or classified ad sites require that a money order or cashiers check be delivered to the seller before the seller needs to ship the product. This places a great risk of loss on the buyer who has little or no recourse if the goods are damaged or not even shipped. Unlike the garage sale buyer in the physical world who has a chance to inspect and test the merchandise before paying for it, the auction site or classified ad site buyer in the Internet world must currently proceed on faith that the seller has honestly and accurately represented the quality and state of the goods to be purchased. Further, it is inconvenient, slow and costly for the buyer to purchase goods using a cashier's check or money order. It would be desirable to provide a method and system allowing a consumer to purchase goods from another non-merchant individual without needing to go through the process of obtaining a cashier's check or money order or waiting for the payment to be mailed to the seller.

At least one company, recognizing this problem, has developed an "escrow" service designed to facilitate payment between individuals for Internet transactions (see, e.g., the system described at www.iescrow.com). In these escrow type systems, the buyer pays the escrow company the amount agreed-upon between the buyer and seller. After the seller has shipped the goods to the buyer and the buyer has had a reasonable chance to inspect the items(s), the escrow company pays the seller (minus a commission). Unfortunately, however, this form of an escrow service introduces new problems and complexity into the purchase process: the escrow service provider is actually the entity being paid for the goods; the escrow company is a third party to the transaction and is a company that is generally not known to the buyer and seller; or the escrow company may be paid by the buyer yet somehow fail to pay the seller.

Further, the escrow service provider typically pays the seller using a check or money order. This can be an inconvenient and slow process for the seller, who would like to be paid quickly and conveniently. The commission charged by the escrow service, which can be relatively large, is a deterrent to many buyers and sellers, especially where the transaction involves a small dollar amount (e.g. less than $20). Commissions and shipping can add 50% or more to the cost of purchasing an item. One reason that these escrow services charge such a high commission is the relatively high overhead expense required to receive and generate payments via checks and money orders.

Accordingly, it would be desirable to provide a system and method for allowing individual consumers to advertise and sell their goods to other individual consumers which allows the efficient use of existing payment cards to facilitate the transaction. Further, it is desirable to allow the purchase amount to be directly credited to a seller's payment card account. The system should be easily integrated into Internet commerce and package shipping web sites.

SUMMARY OF THE INVENTION

Accordingly, a person to person payment system and method is described which allows individuals who have current and valid payment cards to make payment to and receive payment from other individuals who have current and valid payment cards.

According to an embodiment of the invention, a transaction server is provided which is coupled to financial authorization network. Individual participants in the payment system register with the transaction server by providing information regarding at least one payment card account. Successful registration requires that the payment card account be valid. In addition, other risk reduction analyses may be performed at the time of registration to provide an enhanced level of security and/or to reduce the risk of fraud or credit loss. Once registered, participants are given at least an account identifier (ID) to reference and access the established account record.

Participants may negotiate the terms of purchases over the Internet or in the physical world. Once a sale price and terms have been established, one party contacts the transaction server and provides details regarding the transaction, including the party's account ID. A transaction record is created by the transaction server for the current transaction. The other party to the transaction then confirms details regarding the transaction and provides his or her account ID. This information is added to the transaction record, and authorization and other risk analyses are performed on the transaction.

If the transaction is authorized, the buyer's payment card account is debited. The amount debited may either be directly credited to the seller's payment card account or may be held in an escrow account for a period of time. Preferably, if an escrow account is used, the escrow period is established to allow the buyer to receive and inspect the goods. Upon successful completion of the escrow period, the payment amount is directly credited to the seller's payment card account.

In alternative embodiments, shipping terms may also be negotiated and paid for directly from the buyer's payment card account or the escrow account. Further, transaction fees may also be directly deducted from the buyer's payment card account or the escrow account.

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

A further understanding of the nature and advantages of the invention may be realized by reference to the remaining portions of the specification and the drawings.

DESCRIPTION OF SPECIFIC EMBODIMENTS

Figure 1:
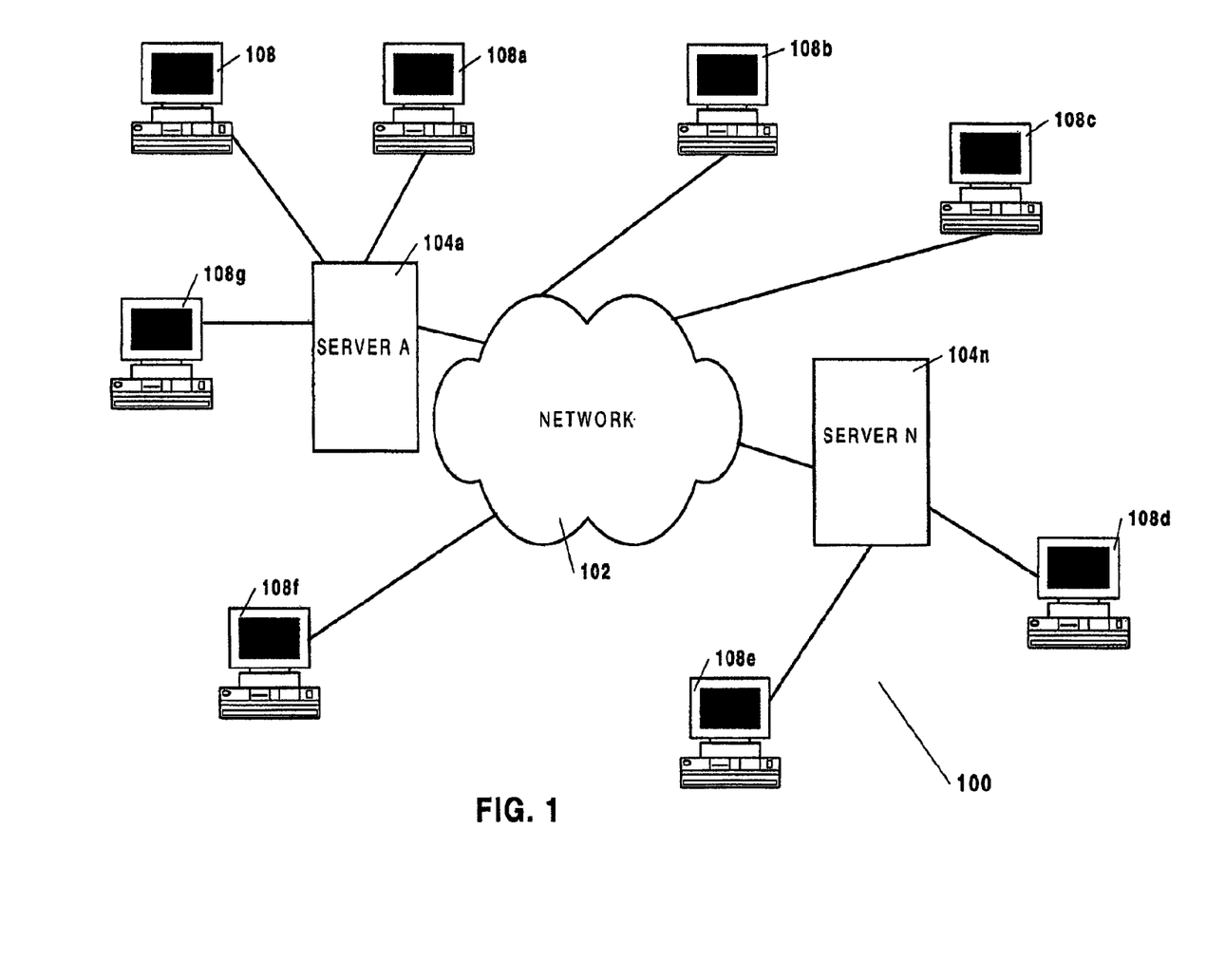
FIG. 1 is a block diagram depicting a network environment implementing an embodiment of the present invention.

Features of embodiments of the present invention will now be described by referring first to FIG. 1, where a payment system 100 according to the invention is shown. Payment system 100 is shown implemented across a network 102. Network 102, in a particular embodiment, is the world-wide network of networks known as the "Internet". Upon reading this disclosure, those skilled in the art will recognize that other network and communication infrastructures may also be used in the implementation of the present invention. Further, variations of the present invention may be implemented without reliance on the Internet or other networks. Although embodiments of the invention may be implemented using other networks, the Internet is currently preferred because of its accessibility from around the world using common interfaces and protocols. These common interfaces and protocols are well known in the art. For example, the Internet uses a communication protocol referred to as the "Transmission Control Protocol/Internet Protocol" (TCP/IP). The Internet also makes use of a number of common information transport protocols, including basic file transfer protocols (FTP). Other, more interactive, protocols have also been developed for use on the Internet.

In the past several years, a graphically-interactive information transport protocol has been widely accepted on the Internet. This protocol, called the "Hyper Text Transfer Protocol" (HTTP) enables use of a distributed information system known as the "world wide web" (the "web" or "WWW") which follows a conventional client-server model. The web allows client computers to use browser software to view and interact with documents residing in servers across the Internet. Web clients and servers communicate using the HTTP protocol to transfer both textual and graphical information in a coordinated manner. An HTTP session is established between a client browser and a server based on a request initiated by the client browser. This request typically involves the client browser's specification of a Uniform Resource Locator (URL) of the desired server. The request typically follows the format: <protocol identifier>://<protocol server address>/<qualifier>, where the protocol may include, e.g., HTTP, FTP, etc. The development and proliferation of web servers providing information via the WWW has led to an explosion of Internet commerce applications, including the development of auction and classified ad sites.

For the purposes of this disclosure, examples will be given referring to Internet sites and resources which utilize the HTTP protocol. Those skilled in the art will recognize that other network interfaces and protocols may be used. For example, network 102 may be a public or private X.25 network using SNA or ATM protocols, etc.

Payment system 100 includes a number of terminals 108a-108n and a number of servers 104a-n. In general, terminals 108a-n are small computers or "personal computers" or workstations operated by human operators to retrieve, browse, or interact with information and service providers across the Internet. Servers 104a-n, in general, are larger computers or workstations configured and used to store data and information for retrieval over the Internet. In this simplified scenario, terminals 108a-108n are clients and servers 104a-n are the servers in the client-server relationship. Because of the design of the Internet and the web, roles of the computers can be reversed in any given transaction, for example, the smaller computers may also act as "servers" by providing information to the larger computers.

The web uses the client-server model to communicate information between clients and servers. Web servers are coupled to the Internet and respond to requests from web clients.

Terminals 108a-n and servers 104a-n may be implemented using any of a number of computing platforms, such as desktop personal computers, laptops, personal digital assistants, screen phones, workstations, etc., running an operating system such as Windows, DOS, UNIX, OS/2, NT, or the like.

Figure 2:
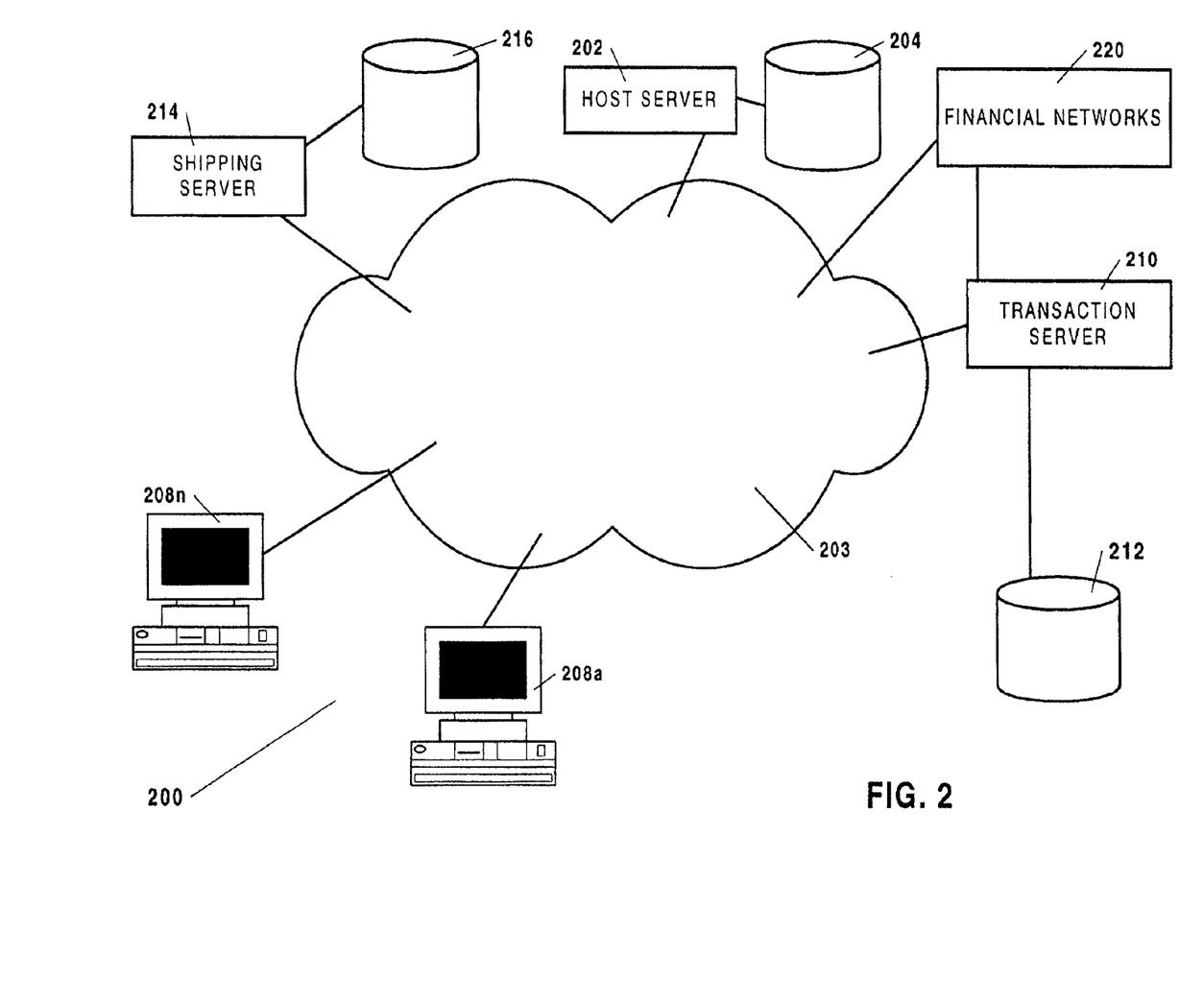
FIG. 2 is a block diagram depicting a network payment environment implementing a specific embodiment of the present invention.

FIG. 2 shows an embodiment of a payment system 200 according to the invention in more detail, and includes a number of terminals 208a-n connected to a network 203. For simplicity, these terminals are shown as being directly coupled to network 203. Those skilled in the art will recognize that terminals 208 may also be coupled to network 203 through, e.g., Internet Service Providers (ISPs), through corporate networks, or the like.

A transaction server 210 is also shown connected to network 203. Transaction server 210 is coupled to a transaction server storage device 212 and is also coupled to a financial network 220. In one specific embodiment, transaction server 210 is operated and managed on behalf of a financial institution or a payment card association, such as Visa, and follows established risk control and management rules. Transaction server 210 is configured to send and receive financial messages to financial network 220 which, in one specific embodiment, is the VisaNet network. Preferably, financial network 220 is a network which permits transaction server 210 to send authorization requests and inquiries to payment card issuing institutions, to receive authorization and inquiry responses, and to cause funds clearing and settlement functions to take place in a manner to be described below.

A host server 202 is also shown connected to network 203, and is configured to store and manage a number of classified advertisements posted by a number of sellers, including a seller operating terminal 208n. Posted classified advertisements are stored in host server storage device 204 for viewing by potential buyers, including a buyer operating terminal 208a. For example, a potential buyer may view classified advertisements by directing a web browser running on terminal 208a to the IP address of host server 202 (e.g., http://www.hostname.com), and by following any HTTP menus or links established by the operator of host server 202. This host server 202 may be a server operated by (or on behalf of) a newspaper, a so-called "Portal" site, a company in the business of facilitating commerce between individuals, or any other entity interested in providing a capability allowing individual sellers to sell new or used goods or services to individual buyers.

A shipping server 214 is also shown connected to network 203. Shipping server 214 may be any site established or run on behalf of a company or agency in the business of shipping goods (e.g., DHL, Federal Express, U.S. Post Office, etc.).

Figure 5:
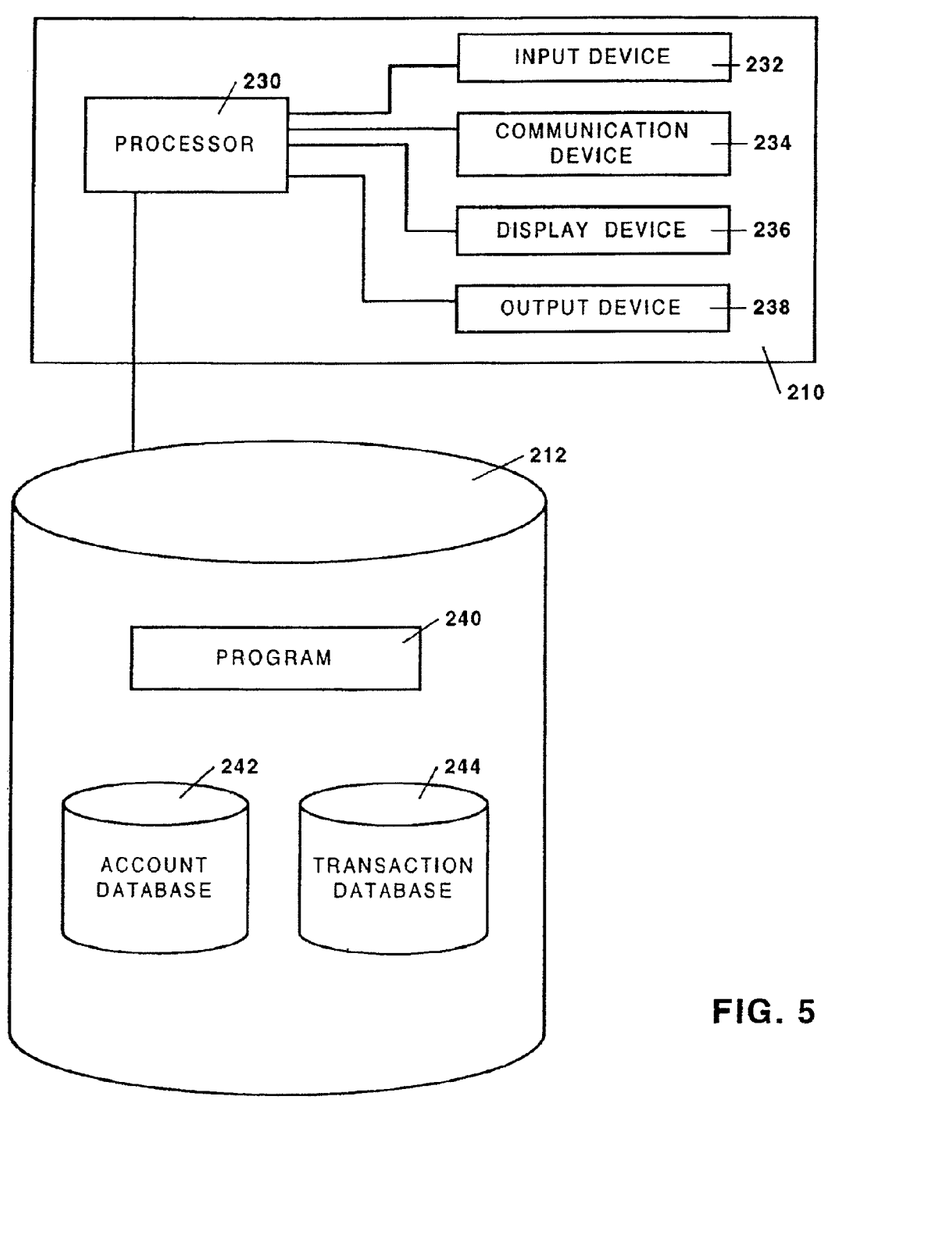
FIG. 5 is a block diagram depicting a transaction server according to an embodiment of the present invention.

Further details regarding an embodiment of transaction server 210 are shown in FIG. 5. Transaction server 210 includes a processor 230, such as a conventional Intel microprocessor or the like. Processor 230 is in communication with storage device 212 which may be an appropriate combination of magnetic, optical and/or semiconductor memory. Processor 230 and storage device 212 may each be located within a single computer or other computing device. Alternatively, or in addition, they may be connected to each other via a remote communication medium (e.g., a serial port, telephone line, or RF transceiver).

Processor 230 is operatively coupled to an input device 232, which may include a keyboard or keypad for transmitting input or control signals to processor 230. A display device 236 is preferably a video monitor for displaying information from processor 230, while output device 238 may be a printer for printing hardcopy output from processor 230. A large number of types of input devices, display devices, and output devices are known to those skilled in the art, and need not be described in detail herein.

Communication device 234 is preferably a telephone or cable modem allowing communication between transaction server 210 and network 203 (of FIG. 2). Alternatively, communication device 234 may be a network adapter, or any of a number of different types of communication devices known in the art.

Storage device 212 stores a program 240 for controlling processor 230. Processor 230 performs instructions of program 240, and thereby operates in accordance with the present invention, and particularly in accordance with the methods described in detail herein. Program 240 further includes program elements that may be necessary, such as an operating system and "device drivers" for allowing processor 230 to interface with components coupled to processor 230 (e.g., input device 232, etc.). Appropriate device drivers and other necessary program elements are known to those skilled in the art, and need not be described in detail herein.

Storage device 212 further stores databases or datastores, including an account database 242 and a transaction database 244. Account database 242 and transaction database 244 and data stored therein are described in more detail below. As will be understood by those skilled in the art, the schematic illustrations and accompanying descriptions of the databases presented herein are exemplary arrangements for stored representations of information. A number of alternative arrangements may be employed other than the databases and tables shown herein. Similarly, the illustrated entries and data elements represent exemplary information, but those skilled in the art will understand that the number and content of the entries can be different from those illustrated herein.

These components, when implemented according to features of the present invention as described below, interact to permit participating individuals to purchase goods or services from other participating individuals using payment cards or other types of accounts, such as checking or savings accounts, money market accounts, etc.

Referring again to FIG. 2, in one specific embodiment, payment system 200 is configured to enable a first participant operating terminal 208a to purchase goods or services from a second participant operating terminal 208n. In this particular embodiment, payment system 200 may be used to support any type of transaction between participants, including, for example: a purchase of goods offered by one participant at a garage sale; a purchase of goods offered by a participant in a traditional newspaper classified ad; a purchase of goods over the Internet via, e.g., an auction or classified ad site; a purchase of services provided by one participant to another; and any other similar transaction between participants.

Figure 3:
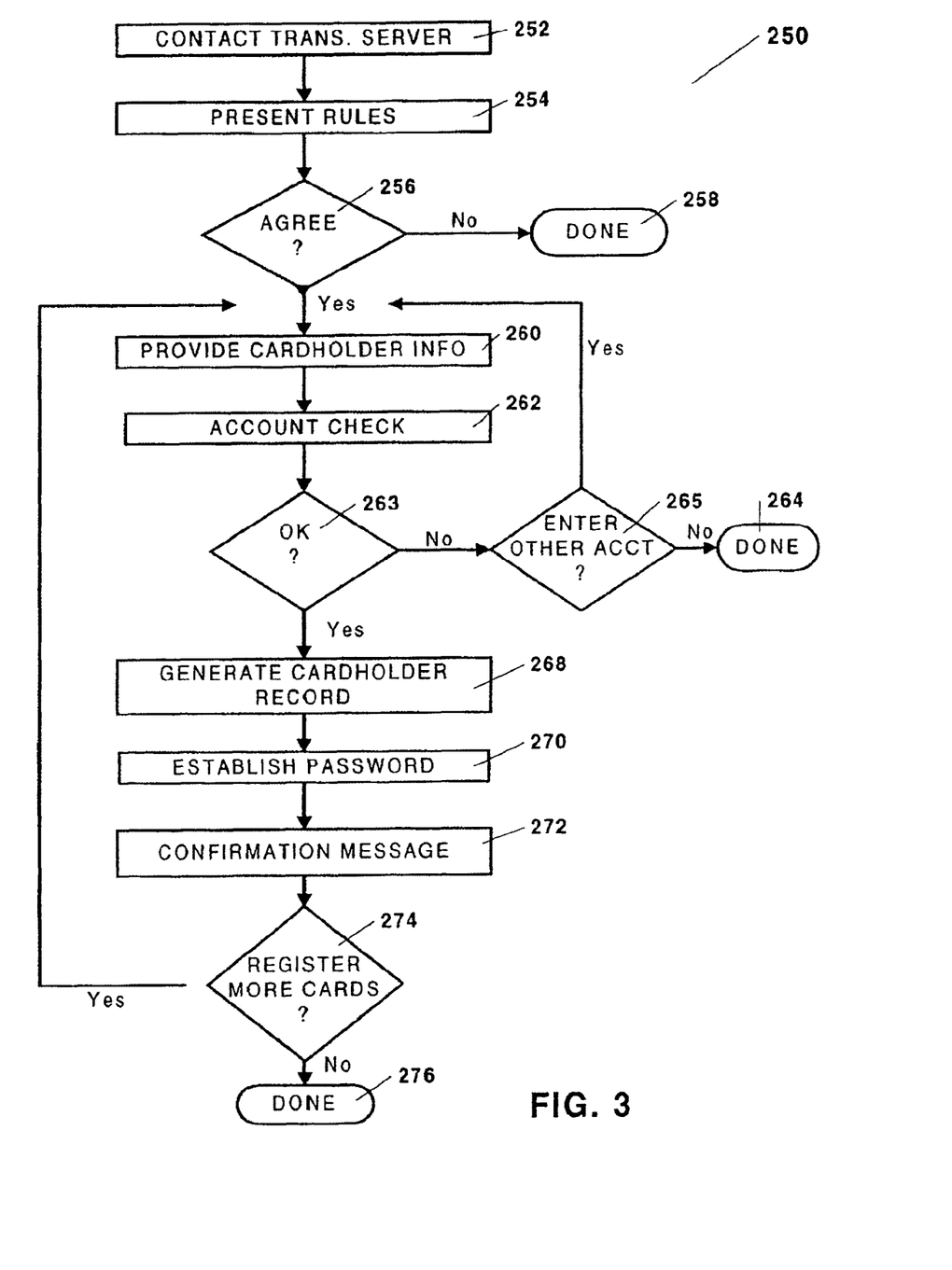
FIG. 3 is a flow diagram depicting a seller and a buyer registration process according to an embodiment of the present invention.

This first embodiment will be described by first referring to FIG. 3, where a registration process 250 is depicted. In describing this embodiment, references will also be made to components of FIG. 2. In this embodiment, registration process 250 is generally the same for all participants and allows registrants to act as a buyer, a seller or both. Once registered, a participant will be given a unique identifier, or "account ID" which he or she can communicate to other individuals to let them know that the participant is able to pay or receive payment using the payment methods of the present invention. Alternatively, as discussed below in conjunction with FIG. 4, participants may register at the time of completing a transaction.

Registration process 250 begins when a participant contacts transaction server 210 (step 252). A participant may contact transaction server 210 in a number of ways. For example, a participant may contact the server over network 203 by directing a web browser running on terminal 208 to the IP address of transaction server 210 (e.g., http://www.transactionserver.com), and by following any HTTP menus or links established by the operator of the transaction server. Alternatively, a participant may register by contacting transaction server 210 using electronic mail or other messaging services. As a further alternative, a participant may contact an operator of transaction server 210 by interacting with a sales agent or voice response unit over a telephone or in person.

Once a participant has contacted transaction server 210 and has indicated a desire (e.g., by following menu instructions, etc.) to register for participation in the payment service, a set of payment rules and regulations may be presented to the participant by transaction server 210 (step 254). These rules are provided to each participant to ensure that he or she fully understands the terms under which payment may be made using a payment card and the terms under which payment may be credited to a payment card account from a buyer's payment card account. In one embodiment, the payment rules may be provided to participants in the form of a so-called "click-wrap" contract which must be completed and agreed to by each participant before further processing can occur (step 256). A participant refusing to provide required cardholder information will also cause the registration process to abort.

If the participant agrees to the rules, registration processing continues at step 260 where the participant is prompted to enter specific account and cardholder information. At this step, the participant is asked to provide detailed account information such as: cardholder name; address; e-mail address; telephone number; payment card account number; the expiration date of the payment card to be registered. Preferably, this information is entered in a secure session between terminal 208 and transaction server 210. For example, a secure session may be established using secure HTTP (SHTTP) or secure socket layer (SSL) techniques.

Other security techniques may also be used, so long as the confidentiality of the entered information is preserved. In addition, techniques may be used to authenticate the identity of the participant. For example, the participant may be identified using a public key certificate or other techniques known in the art. Details regarding security techniques to preserve the confidentiality of information or to authenticate the identity of participants is described in *Applied Cryptography*, Schneier 2d Ed. 1997, the contents of which are hereby incorporated by references for all purposes.

After transaction server 210 receives all required cardholder information, an account check may be performed (step 262). An account check is any check or verification process performed to verify the authenticity and validity of the account information provided in step 260 and may comprise the generation of a balance inquiry message or other authorization check of the account information through financial network 220. For example, if the Visa VisaNet system is used, transaction server 210 may generate a balance inquiry message to request the balance of a cardholder's checking, savings, credit card, or other account information provided in step 260. For checking, savings, and accounts other than credit card accounts, the financial institution either returns the account ledger balance or the account available balance. For credit card accounts, the payment card issuer returns either the amount of credit remaining to buyer 208 or buyer's credit limit. Alternatively, a status check request may be generated which is an authorization request for one unit of currency (e.g., 1 U.S. dollar). In response, an authorization message will be returned to transaction server 210. Transaction server 210, depending upon the response received, may allow the registration process to proceed or may terminate the registration in step 264 (e.g., where the participant's account has no available funds remaining or where the account is no longer valid). The type of check performed at step 262 may depend upon, e.g., whether a participant is registering to be a buyer, a seller, or both (e.g., if a participant is registering only to be a seller, information regarding her account balance would probably not be required).

Additional checks may also be performed at this step 262. For example, an address verification check may be performed to verify that the address provided at step 260 is accurate and matches records maintained by the payment card issuer. Alternatively, or in addition, the entered payment card information may be checked against hot card lists to determine if the card has been reported as being lost or stolen. Other verification and status checks may also be performed at this stage. For example, transaction server 210 and/or financial network 220 may perform a risk analysis for each card registration, taking into account data elements for the present registration, such as: the past history of the participant attempting to register; frequency of attempts at registration; other activity on the payment card accounts being registered; nature of the participant's e-mail addresses (e.g., are they anonymous e-mail addresses which do not verify the identity of the participant?); Internet dial-in location; etc. Risk techniques known in the art may be used to assess a risk variable to each transaction based on an analysis of these variables. In the event that a particular registration appears to carry a high probability of fraud, the registration should be aborted without generating a cardholder account record or confirmation message. For example, neural network or rule based fraud analysis and detection techniques may be used to analyze the account and to predict or detect fraudulent or risky activity.

In some circumstances, if the account check or status check fails at step 263, the participant may be given an opportunity to re-register using an alternative card (step 265). In general, the opportunity to re-register should not be given if a risk analysis performed at step 262 indicated that the registration involved a risk of fraud (e.g., the participant had attempted to register a lost or stolen card, etc.).

If, after performing a successful status or other account check, transaction server 210 determines that registration may continue, a cardholder account record is generated for the participant (step 268). This cardholder account record contains information identifying the participant and includes information input at step 260 and may also include other information provided by transaction server 210, including: a unique identifier of the participant, referred to herein as an "account ID"; an expiration date for the registration; information from the authorization request, status check and/or other fraud checks that were performed; etc. The account ID is generated uniquely for each participant and is used as a record locator to retrieve the cardholder account record. Those skilled in the art will recognize that the account ID may be generated in a number of ways, for example, it may simply be a counter incremented as each new participant registers or it may be a more complex unique number such as a random number or a digital signature based on registration information provided by the cardholder. Once a cardholder account record is generated for the participant and a unique account ID has been generated and assigned to the cardholder account record, the information is stored in transaction server storage device 212. Preferably, the information is securely stored using techniques to prevent tampering, theft or other misuse of the information.

Transaction server 210 may then prompt the participant to select a password for use in making or accepting payments using the service (step 270). The use of this password, in conjunction with the unique account ID, will allow the participant to act as a buyer or seller of goods using the payment techniques of the present invention without needing to re-enter personal information and payment card information for each transaction. Instead, as will be discussed, the participant will only need to enter a limited amount of identifying information, such as his or her password and account ID to make or receive payment using the system. Alternatively, or in addition, other authentication techniques may be used to further prevent fraudulent or unauthorized access to account information. For example, virtual or physical authentication tokens containing certificates may be used to authenticate the identity of the participant when the participant attempts to present an account ID.

Upon successful generation and storage of a cardholder account record, a confirmation message is transmitted to the participant, signaling completion of the registration process (step 272). This confirmation message may be transmitted from transaction server 210 to terminal 208 via network 203 as an electronic mail message or may be otherwise communicated to the participant (e.g., via regular mail, telephone, etc.). Preferably, the confirmation message will include the unique account ID and/or some other information that will allow the participant to uniquely and securely identify the cardholder account record.

At this point, transaction server 210 may give the participant an option of registering further payment cards for use with the service (step 274).

Registration process 250 is repeated for each individual who wants the ability to pay or to receive payment from other individuals using the person to payment techniques of the present invention. Any number of individual participants may register for the service. Further, although only a single transaction server 210 is shown in FIG. 3, those skilled in the art will recognize that any number of transaction servers 210 may be used to accommodate participants. For example, different transaction servers may be used to comply with or support different regional or national laws or other requirements, e.g., a transaction server in the U.S. may perform certain risk, fraud; or other checks that are not necessary or relevant for a transaction server located in France.

Figure 4:
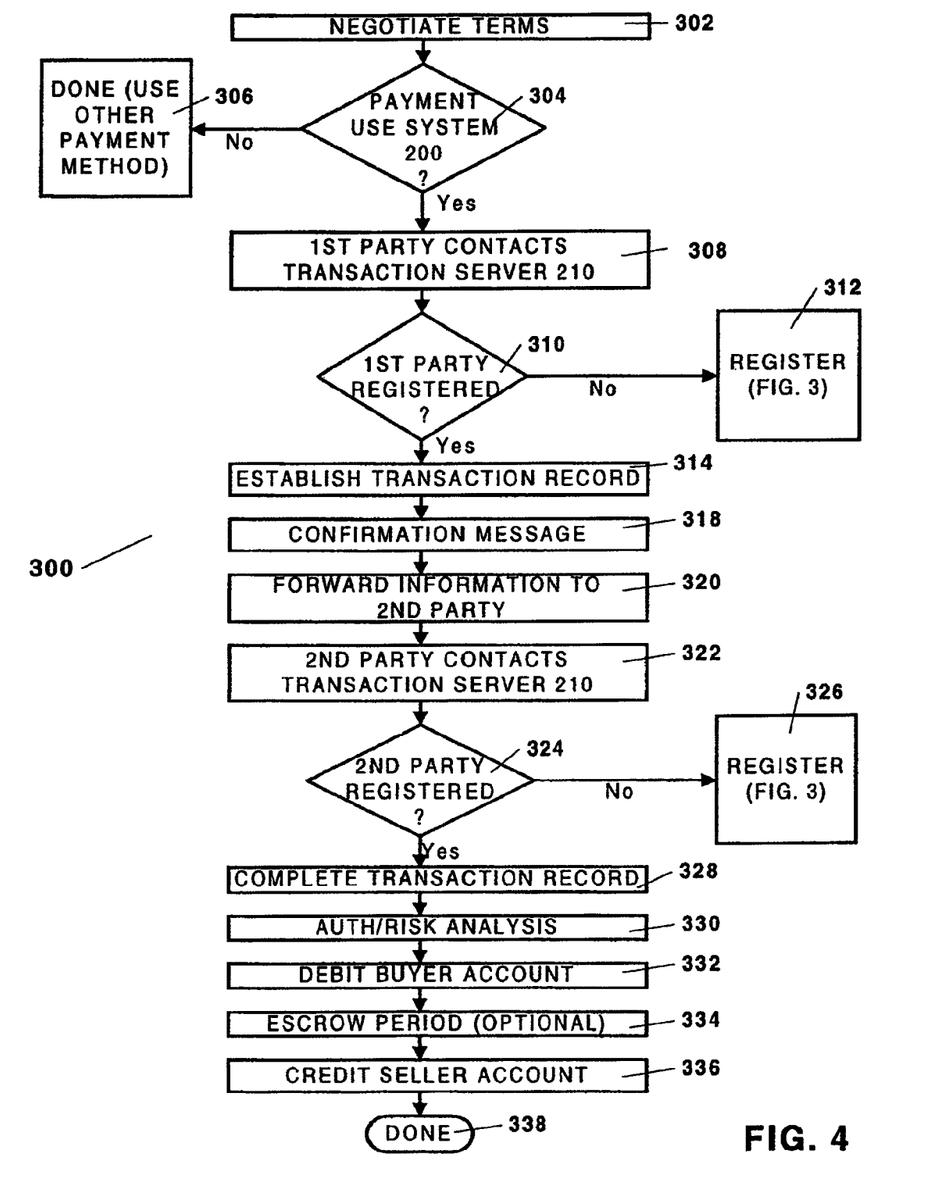
FIG. 4 is a flow diagram depicting a purchase process according to an embodiment of the present invention.

An example payment process 300 will now be described by referring to FIG. 4. Payment process 300 occurs when two participants, for example, a buyer operating terminal 208a and a seller operating terminal 208n wish to conduct a purchase transaction. The two participants first negotiate terms of the transaction (step 302). This negotiation process may occur over network 203 or may be accomplished in the physical world. For example, the negotiation process may involve one participant answering a newspaper classified ad of the other participant and the two participants agreeing on a sale price and delivery terms. The negotiation between a service provider (e.g., a gardener) and a customer (e.g., a homeowner) may involve the oral establishment of a price for the services with the agreement that the service provider will be paid once services are performed. In an example negotiation process over network 203, the selling participant may have advertised goods for sale on an Internet classified ad or auction site, and the buying participant may have seen the advertised goods on the Internet, made an electronic offer via e-mail or other form of communication, and had the offer accepted by the seller. The negotiation process, whether conducted in the physical world or over the Internet, will generally involve the participants reaching agreement as to price, delivery, and nature of the goods or services being purchased.

The negotiation process will also result in the participants agreeing on a payment method. If the two parties agree (step 304) to use the payment method according to the present invention, processing continues to step 308 where one of the two participants to the transaction contacts transaction server 210 via the Internet or other means (e.g., telephone or mail). In one embodiment, the seller of the goods or services is the first party to contact transaction server 210, although either participant may contact the server to initiate the purchase. The following paragraphs provide a discussion of a transaction where a seller of goods is the first party to contact transaction server 210 and the buyer of goods is the second party to contact the server. Those skilled in the art, upon reading this disclosure, will recognize that a similar flow and techniques may be used in a transaction where the buyer contacts transaction server 210 before the seller.

When contacting transaction server 210, the seller (if already registered with transaction server 210), provides his or her account ID and password (or other authenticating information). If the seller has not previously registered for the service, he or she is given the opportunity to register (step 312). If the seller is unable to successfully register for the service (e.g., does not have a valid payment card, etc.)

processing stops and the two participants to the transaction must find some other payment method to consummate the purchase transaction (step 306).

Once the seller has been successfully registered with transaction server 210 and this has been confirmed (step 310) a transaction record is generated for the current purchase transaction (step 314). Generation of the transaction record involves receiving certain details about the transaction from the parties. Where the seller is the party to first contact transaction server, the transaction record generated at step 184 will include all details regarding the transaction as supplied by the seller, including: the account ID of the seller; the date and time of the transaction; the agreed-upon purchase amount; the agreed-upon shipping terms; escrow terms; and buyer contact information (such as an e-mail address of the buyer or other information which will allow the transaction server 210 or an operator to contact the buyer). Where the payment techniques of the present invention are used to purchase services, details regarding the performance of the services may be provided in the transaction record rather than details regarding shipping.

Where goods are purchased using techniques of the present invention, the function of shipping the goods may be an integral part of the purchase process. The transaction record generated at step 314 preferably contains detailed information which will be used to ship the goods (e.g., product weight and dimensions). A buyer will then have the ability to select the preferred mode of delivery and receive an actual or estimated price from the selected shipper. Alternatively, the seller may dictate the terms of shipping (e.g., by insisting that one mode of delivery, such as Federal Express, be used). In this case, the seller will enter sufficient details regarding the shipping so that a total shipping cost may be calculated. Further details regarding the integration of the shipping function and the establishment of the transaction record are provided below.

Other information which may be provided to establish a transaction record at step 314 includes details regarding an optional escrow period which may be set by transaction server 210 or agreed-upon by the parties. This optional escrow period may be used to ensure that goods are shipped and received in good order before the seller is paid for the goods. Further details regarding the optional escrow process are provided below.

The transaction record generated at step 314 may also include a detailed description of the goods or services being sold to assist in dispute resolution. For example, the seller may choose to include a digital photograph of the goods being sold.

Once the transaction record is completed with information provided by the seller, transaction server 210 assigns a unique transaction ID to the transaction record. This transaction ID is used to uniquely identify the transaction record and may be used by the buyer and the seller to reference the current transaction. The transaction ID may simply be a sequentially-assigned number identifying the transaction or it may be a more complex digital signature uniquely generated based on transaction information. This transaction ID is used to uniquely associate the buyer with the seller and with the specific transaction. The transaction ID may appear on the buyer and seller payment card statements, for example.

At this time, an optional status request or account check may be performed by sending a message from transaction server 210 to financial networks 220. This status request or account check may be generated to determine if the seller's payment card or account which will be credited for the amount of the purchase is still valid. Preferably, however, this status request or account check is done in conjunction with step 330 below.

Once a transaction record is generated for the current transaction, transaction server 210 generates a confirmation message (step 318). This confirmation message will include a reference to the transaction ID and will also include a period of validity (e.g., the confirmation may be good for a short period, such as twelve hours, etc.). If a period of validity is established, the transaction must be completed (goods shipped, received and accepted, or services rendered and accepted) within that period.

Transaction server 210 (or an operator of transaction server 210) preferably sends the confirmation message to both the seller and the buyer (step 320), e.g., by sending an e-mail message to the buyer or by otherwise contacting the parties. To simplify this communication, an e-mail confirmation message sent to the buyer may include a URL pointer to a web page established on transaction server 210 for the specific transaction. The buyer can then access transaction server 210 (step 322) by simply pointing his or her web browser to the provided URL address to complete the transaction.

When contacting transaction server 210, the buyer provides the transaction ID and his or her account ID and password. Alternatively, or in addition, other authentication techniques may also be employed to more securely authenticate the buyer's identity. If the buyer has not yet registered (e.g., does not have an account ID and password), the registration process of FIG. 3 is completed (step 326). Once transaction server 210 has confirmed that the buyer is registered, the buyer is prompted to enter information to complete the transaction record accessed by the transaction ID (step 328). The buyer is prompted to enter information including, for example: his or her account ID; information regarding shipping; etc.

Embodiments of the present invention may be implemented such that shipping of a good is integrated with the purchase transaction. This has several benefits, for example: it simplifies the overall transaction between the buyer and seller; shipping and confirmed delivery of the goods may be used to trigger the transfer of funds to the seller's account; and it simplifies the debiting of the buyer's payment card account by allowing a single debit for both the cost of shipping and the purchase price of the goods.

The buyer may enter specific information regarding shipment of the goods to be purchased. For example, if the seller has provided information regarding the dimensions and weight of the good (at step 314), the buyer can finalize details of shipping by selecting a mode of delivery. For example, the buyer may select the shipper (e.g., Federal Express; UPS; etc.), the mode of shipment (e.g., overnight delivery; same day service; etc.), and delivery information. Shipping information provided in step 328 may result in transaction server 210 linking to shipping server 214 to retrieve or share information regarding shipping terms and conditions. Alternatively, the seller may establish certain shipping details (e.g., such as requiring that the good only be shipped via Federal Express next day delivery, etc.).

As an example, if Federal Express delivery of the goods has been selected, transaction server 210 may connect to a shipping server operated by or on behalf of Federal Express and forward information regarding the goods to be shipped, including the shipping weight and dimensions and delivery details. Shipping server 214 may then generate a tracking number and calculate the shipping price for the goods. This information may then be returned to transaction server 210 for entry into the transaction record. Preferably, this interaction between shipping server 214 and transaction server 210 is transparent to the participants. Transaction server 210 may now track or monitor the status of the goods by reference to the shipping tracking number.

Before completing the transaction, the buyer may be given the opportunity to review all details regarding the transaction, including the information entered by the seller regarding the condition and description of the goods to be sold. The buyer can choose to modify the information, cancel the purchase, or approve the transaction.

If the buyer chooses to approve the transaction, the transaction record is completed by transaction server 210 (step 328) and an authorization request is then sent from transaction server 210 to financial networks 220 (step 330). This authorization request is generated to determine if the buyer's payment card or account which is to be used to make the purchase has sufficient funds or credit limit available to cover the cost of the transaction. If shipping, handling, and other transaction fees are to be included in the total transaction price, the authorization request is generated to determine if the payment card or account has sufficient funds to cover the total amount. If the authorization request is declined (e.g., the identified account has insufficient funds, or is otherwise invalid), purchase transaction 300 aborts and the buyer and seller will need to arrange for some other form of payment to be used (e.g., the buyer may be given a chance to use another payment card by repeating the above process). Additionally, a status request or account check may be performed on seller's account by sending a message from transaction server 210 to financial networks 220. This status request or account check may be generated to determine if the seller's payment card or account which will be credited for the amount of the purchase is still valid.

To further reduce the risk of fraudulent transactions (e.g., use of stolen buyer account numbers or buyer/seller collusion) the seller's account, the buyer's account and details regarding the present transaction may be subjected to further analysis in addition to the authorization request. For example, transaction server 210 and/or financial network 220 may perform a risk analysis for each transaction taking into account data elements for each transaction such as: the past history of the buyer and seller as participants; the amount of the transaction; the type of item being purchased; frequency of purchases; time of the transaction; other activity on the payment card accounts; nature of the participant's e-mail addresses (are they anonymous e-mail addresses which do not verify the identity of the participant?); Internet dial-in location; etc. Risk techniques known in the art may be used to assess a risk variable to each transaction based on an analysis of these variables. In the event that a particular transaction appears to carry a high probability of fraud or an unreasonably high risk of loss, the transaction should be aborted without generating an authorization at step 330. Other transaction checking procedures may also be performed as discussed in conjunction with FIG. 3 at step 262 discussed above.

In one embodiment, the actual debit of the buyer's account does not occur until either the goods have been shipped or the goods have been delivered. This can be tracked if a shipping service such as Federal Express has been used which tracks and reports the pickup and delivery of packages. For example, if buyer (at step 328) has indicated that he or she would like to receive the goods using Federal Express next day delivery, shipper server 214 (in this case operated by or on behalf of Federal Express) may establish a unique tracking number for the package. This unique shipping tracking number is associated with the transaction ID generated above. Shipping server 214 may notify transaction server 210 when the goods have been picked up from seller and when they have been delivered to buyer. This notification is preferably done by referring to the unique shipping tracking number. Once the goods have been confirmed as having been either picked up or delivered, transaction server 210 may take the necessary steps to ensure the buyer's account is debited for the transaction price.

The buyer's account is debited using a debit message which is sent by transaction server 210 to financial networks 220. This debit message identifies the buyer's account information and the debit amount (the total amount of the transaction). For example, if a purchase price of $50.00 was agreed upon, and a $10.00 Federal Express delivery was agreed upon, a debit message for the total amount of the transaction ($60.00) will be generated. In some embodiments, depending upon the type of messaging used by financial networks 220, the authorization request and the debit message may be combined into a single message.

The amount debited from the buyer's account may then be placed in an optional escrow account (step 334), or may be directly credited to any accounts as established in the transaction record generated at step 328. For example, a $50.00 payment may be made to the seller's payment card account while a $10.00 payment may be made directly to Federal Express to pay for the cost of shipping the goods. The amount of the purchase is directly credited to seller's designated payment card account (i.e., the payment card account that the seller registered with transaction server 210 in the registration process of FIG. 3). To credit the sellers payment card account, transaction server 210 will generate a credit message which includes information including the credit amount, a source of funds, and the seller's payment card account number to be credited. This credit message will be forwarded from transaction server 210 to financial networks 220 for processing. The source of funds for the credit message will be either the buyer's payment card account number or the escrow account (if the optional escrow account is used).

If the optional escrow account (of step 334) is used, the funds debited from the buyer's account may be held in the escrow account until transaction server 210 receives some notification that the buyer properly received the purchased product in good shape and as advertised. A set escrow period may be established by transaction server 210 (e.g., all purchases processed by a given transaction server may be given a five-day escrow period) or may be established by agreement among the participants to a transaction. In one alternative embodiment, the escrow period may be triggered by transaction server 210 receiving some indication from shipping server 214 that the goods have been shipped or received. If the escrow period lapses without dispute by the buyer, the sellers account is credited with the purchase price (step 336) and the payment process is completed (step 338). If the optional escrow account is used, the credit message to credit the seller's payment card account will only be generated after the escrow period has successfully ended. The buyer will have a "chargeback" right during the escrow period (that is, the seller's account will not be credited during the escrow period). Alternatively, or in addition, the buyer can signal to server 210 that the transaction is completed to his or her satisfaction, thereby terminating the escrow period.

Figure 6A:
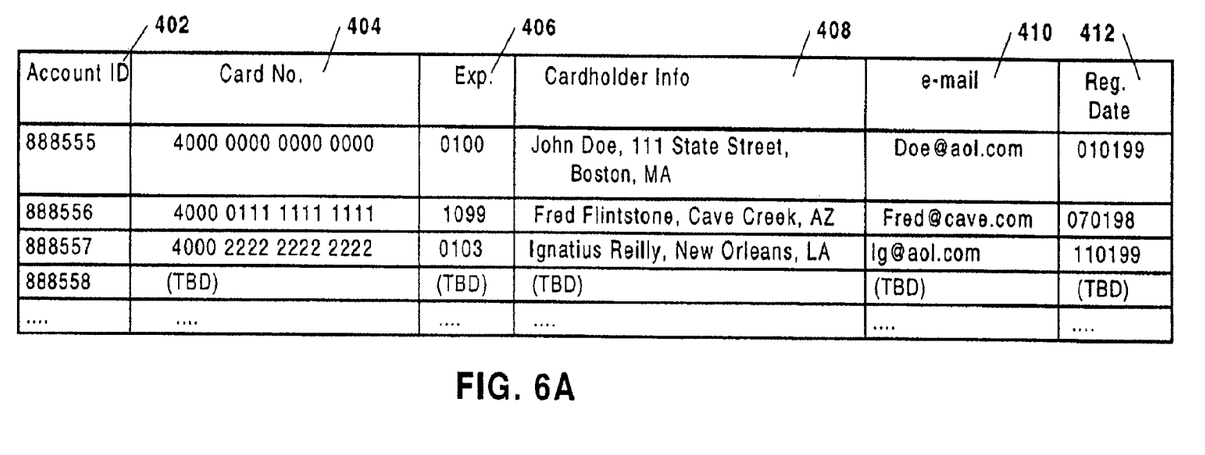
FIGS. 6A and 6B are schematic illustrations of databases of FIG. 5.
Figure 6B:
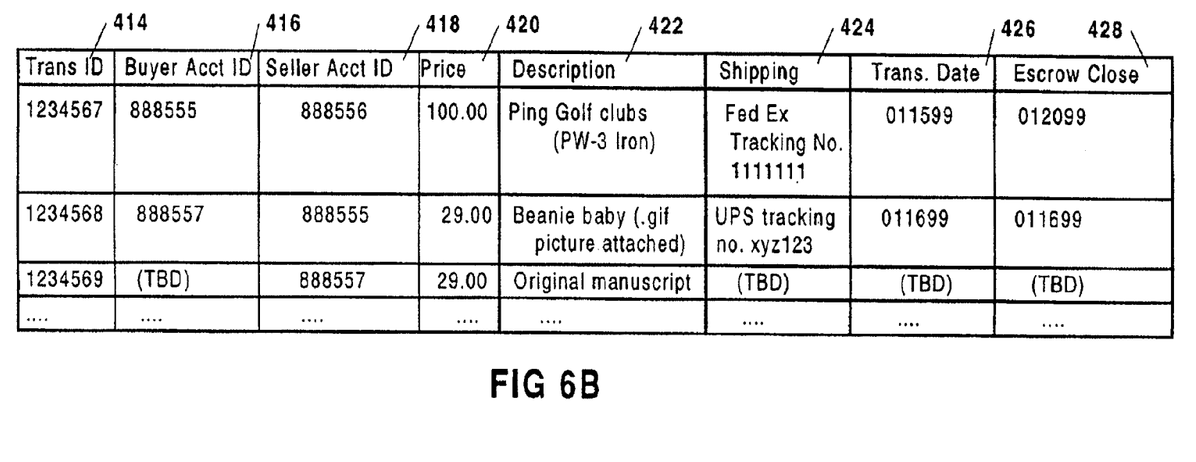

Referring now to FIG. 6, example database structures for account database 242 and transaction database 244 are shown (in FIGS. 6A and 6B respectively). The entries of these example databases illustrate various pieces of information that may be entered into and tracked by each database. For example, in FIG. 6A, account database 242 may include a number of entries, each keyed by an account ID 402. Account ID 402 identifies a particular participant by including data describing the participants card number 404, its expiration data 406, cardholder information 408, an e-mail address 410, and a registration date 412. This information will be obtained when a participant registers (either through the process of FIG. 3 or the process of FIG. 4). Only the account ID need to be communicated to other participants, ensuring that cardholder information is protected by transaction server 210.

In FIG. 6B, an example format of transaction database 244 is shown. Transaction database 244 may include a number of entries, including, for example: a transaction ID 414; a buyer account ID 416; a seller account ID 418; a price term 420; a description of goods or services to be sold 422; a shipping field 424; a transaction date 426; and an escrow close 428. This information is generated and obtained as described in conjunction with the process of FIG. 4 above. Those skilled in the art will recognize that other data elements and information may be provided in transaction database 244 and account database 242.

Those skilled in the art will now recognize that embodiments of payment system 200 may be used to facilitate different types of transactions between individuals. For example, payment system 200 can be used to facilitate classified ad or auction-style purchases in the physical world or over the Internet. Both buyer and seller need to have (or be able to acquire) account IDs from transaction server 210 to complete a transaction according to the invention. Payment system 200 may also be used to facilitate the purchase of services. For example, a babysitter may receive payment to his or her payment card account from a parent's payment card account for babysitting services if both the babysitter and the parent have registered their respective payment cards with the service (e.g., by following the registration steps of FIG. 3). The parent may authorize payment by simply dialing a voice response unit associated with transaction server 210 to authorize debiting of the parent's account and crediting of the babysitter's account once services have been rendered; The result is a simple, efficient, and cost effective system for making and receiving payments between individuals. While the above is a complete description of the preferred embodiments of the invention, various alternatives, modifications, and equivalents may also be used. Therefore, the above description should not be taken as limiting the scope of the invention that is defined by the appended claims.

We claim:

1. A method of integrating the shipping of goods with the purchase of the goods, the method comprising:
   recording, by a transaction server, a purchase price of the goods, a first account for an individual buyer and a second account for an individual seller, the seller and the buyer connecting to the transaction server over a network;
   receiving an indication of a chosen shipper by which to ship the goods from the seller to the buyer;
   receiving a tracking number identifying the goods to be shipped by the shipper; and
   receiving a notification from the shipper regarding a status of the goods associated with the tracking number.

2. The method of claim 1 further comprising:
   debiting the first account of the buyer only after the notification is received; and
   crediting the second account of the seller to complete the purchase of the goods.

3. The method of claim 1 further comprising:
   recording, by the transaction server, a transaction date and a transaction ID associated with the transaction.

4. The method of claim 1 further comprising:
   recording, by the transaction server, a description of the goods, a transaction date and a transaction ID associated with the transaction.

5. The method of claim 1 further comprising:
   sending, by the transaction server, a debit message debiting the first account of the individual buyer; and
   sending, by the transaction server, a credit message crediting the second account of the individual seller.

6. The method of claim 1 further comprising:
   sending, by the transaction server, a debit message debiting the first account of the individual buyer, wherein the debit message debits an amount equal to the purchase price and a price for shipping the goods; and
   sending, by the transaction server, a credit message crediting the second account of the individual seller, wherein the credit message is in an amount equal to the purchase amount.

7. The method of claim 1 further comprising:
   sending, by the transaction server, a debit message debiting the first account of the individual buyer, wherein the debit message debits an amount equal to the purchase price and a price for shipping the goods;
   sending, by the transaction server, a first credit message crediting the second account of the individual seller, wherein the first credit message is in an amount equal to the purchase amount; and
   sending, by the transaction server, a second credit message to a shipper, wherein the second credit message is in an amount equal to the price for shipping the goods.

8. The method of claim 1 further comprising:
   debiting the first account of the buyer, wherein the first account is a payment card account; and
   crediting the second account of the seller to complete the purchase of the goods.

9. The method of claim 1 wherein the transaction server operates an auction site, and wherein the transaction relates to purchasing the goods through the auction site.

10. The method of claim 1 wherein the transaction server operates a classified ad site, and wherein the transaction relates to purchasing the goods through the classified ad site.

11. The method of claim 1 further comprising:
    recording, by the transaction server, a transaction date and a transaction ID associated with the transaction, and wherein the first account is associated with a first payment card and the second payment account is associated with a second payment card, and wherein the method further comprises issuing a first payment card statement with the transaction ID and a second payment card statement with the transaction ID.

12. A transaction server comprising:
    a storage device; and
    a processor connected to the storage device;
    the storage device storing a program for causing the processor to implement a method comprising:
    recording, a purchase price of the goods, a first account for an individual buyer and a second account for an individual seller, the seller and the buyer connecting to the transaction server over a network;

receiving an indication of a chosen shipper by which to ship the goods from the seller to the buyer; receiving a tracking number identifying the goods to be shipped by the shipper; and receiving a notification from the shipper regarding a status of the goods associated with the tracking number.

13. The server computer of claim 12 wherein the method further comprises:

debiting the first account of the buyer only after the notification is received; and crediting the second account of the seller to complete the purchase of the goods.

14. The server computer of claim 12 wherein the method further comprises:

recording, by the transaction server, a transaction date and a transaction ID associated with the transaction.

15. The server computer of claim 12 wherein the method further comprises:

recording, by the transaction server, a description of the goods, a transaction date and a transaction ID associated with the transaction.

16. The server computer of claim 12 wherein the method further comprises:

sending, by the transaction server, a debit message debiting the first account of the individual buyer; and sending, by the transaction server, a credit message crediting the second account of the individual seller.

17. The server computer of claim 12 wherein the method further comprises:

sending, by the transaction server, a debit message debiting the first account of the individual buyer, wherein the debit message debits an amount equal to the purchase price and a price for shipping the goods; and sending, by the transaction server, a credit message crediting the second account of the individual seller, wherein the credit message is in an amount equal to the purchase amount.

18. The server computer of claim 12 wherein the method further comprises:

sending, by the transaction server, a debit message debiting the first account of the individual buyer, wherein the debit message debits an amount equal to the purchase price and a price for shipping the goods;

sending, by the transaction server, a first credit message crediting the second account of the individual seller, wherein the first credit message is in an amount equal to the purchase amount; and sending, by the transaction server, a second credit message to a shipper, wherein the second credit message is in an amount equal to the price for shipping the goods.

19. The server computer of claim 12 wherein the method further comprises:

debiting the first account of the buyer, wherein the first account is a payment card account; and crediting the second account of the seller to complete the purchase of the goods.

20. The server computer of claim 12 wherein the transaction server operates an auction site, and wherein the transaction relates to purchasing the goods through the auction site.

21. The server computer of claim 12 wherein the transaction server operates a classified ad site, and wherein the transaction relates to purchasing the goods through the classified ad site.

* * * * *